(12) United States Patent
Sacha (10) Patent No.: US 9,811,228 B2
(45) Date of Patent: Nov. 7, 2017

(54) TOUCH-INPUT DISPLAY DEVICES WITH FORCE MEASUREMENT USING PIEZOELECTRIC PILLARS

(71) Applicant: CA, Inc., New York, NY (US)

(72) Inventor: Martin Sacha, Nové Hrady (CZ)

(73) Assignee: CA, Inc., New York, NY (US)

( * ) Notice: Subject to any disclaimer, the term of this patent is extended or adjusted under 35 U.S.C. 154(b) by 4 days.

(21) Appl. No.: 15/045,660

(22) Filed: Feb. 17, 2016

(65) Prior Publication Data

US 2017/0235387 A1 Aug. 17, 2017

(51) Int. Cl.
*G06F 3/041* (2006.01)
*G06F 3/044* (2006.01)

(52) U.S. Cl.
CPC ............ *G06F 3/044* (2013.01); *G06F 3/0414* (2013.01); *G06F 2203/04104* (2013.01)

(58) Field of Classification Search
None
See application file for complete search history.

(56) References Cited

U.S. PATENT DOCUMENTS

| 4,953,410 A * | 9/1990 | Tabota | G06F 3/0414 |
| | | | 73/862.046 |
| 7,952,566 B2 | 5/2011 | Poupyrev et al. | |
| 8,890,853 B2 | 11/2014 | Schuele et al. | |
| 2007/0285402 A1* | 12/2007 | Lim | G06F 3/016 |
| | | | 345/173 |
| 2012/0262469 A1* | 10/2012 | Allen | G09G 3/2018 |
| | | | 345/571 |
| 2012/0313888 A1 | 12/2012 | Lee et al. | |
| 2016/0209984 A1* | 7/2016 | Richards | G06F 3/0418 |

\* cited by examiner

*Primary Examiner* — Joseph Haley
(74) *Attorney, Agent, or Firm* — Sage Patent Group (57) ABSTRACT

A touch-input display device includes a substrate, piezoelectric pillars that are on and extend away from a surface of the substrate, and light emitter devices each coupled to a different one of the piezoelectric pillars. The substrate has power lines and signal lines. The piezoelectric pillars are electrically isolated from each other, and each of the piezoelectric pillars includes a piezoelectric material that generates an electric voltage across a pair of the signal lines responsive to an applied touch force compressing the piezoelectric pillar. The light emitter devices are each electrically connected to a pair of the power lines.

19 Claims, 6 Drawing Sheets

TOUCH-INPUT DISPLAY DEVICES WITH FORCE MEASUREMENT USING PIEZOELECTRIC PILLARS

BACKGROUND

This present disclosure relates to user interfaces for electronic devices, and more particularly to display devices having touch-input user interfaces.

Touch-input displays are a popular interface on electronic devices to enable users to touch select displayed information. Touch-input displays are used in smart watches, mobile telephones, portable music players, tablet computers, and other electronic devices.

There are many available touch sensor technologies, but the market is currently dominated by two technologies. Low cost electronic devices that do not need multi-touch capability often use resistive touch technology, which measures change in resistance between pairs of electrodes within an array due to a physical touch. Other electronic devices needing multi-touch sensing capability use projected capacitive technology which measures changes in capacitance between pairs of electrodes in an array due to presence of one or more capacitive coupled fingers.

SUMMARY

Some embodiments of the present inventive concepts are directed to a touch-input display device that includes a substrate, piezoelectric pillars that are on and extend away from a surface of the substrate, and light emitter devices each coupled to a different one of the piezoelectric pillars. The substrate has power lines and signal lines. The piezoelectric pillars are electrically isolated from each other, and each of the piezoelectric pillars includes a piezoelectric material that generates an electric voltage across a pair of the signal lines responsive to an applied touch force compressing the piezoelectric pillar. The light emitter devices are each electrically connected to a pair of the power lines.

Some other embodiments of the present inventive concepts are directed to a touch-input display device that includes a touch display circuit, an interface circuit, a processor, and a memory. The touch display circuit includes a substrate, piezoelectric pillars that are on and extend away from a surface of the substrate, and light emitter devices each coupled to a different one of the piezoelectric pillars. The substrate has power lines and signal lines. The piezoelectric pillars are electrically isolated from each other. Each of the piezoelectric pillars include a piezoelectric material that generates an electric voltage across a pair of the signal lines responsive to an applied touch force compressing the piezoelectric pillar. The light emitter devices are each electrically connected to a pair of the power lines. The interface circuit measures electric voltage on at least one pair of the signal lines to generate voltage data. The processor is coupled to receive the voltage data from the interfaced circuit. The memory is coupled to the processor and stores computer readable program code that is executable by the processor to generate force data that indicates a level of touch force applied to one of the piezoelectric pillars based on the voltage data and generate location data that indicates a location of the one of the piezoelectric pillars that generated the measured electric voltage.

Other touch-input display devices, methods, and/or computer program products according to embodiments of the invention will be or become apparent to one with skill in the art upon review of the following drawings and detailed description. It is intended that all such additional touch-input display devices, methods, and/or computer program products be included within this description, be within the scope of the present invention, and be protected by the accompanying claims.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

The present inventive concepts now will be described more fully with reference to the accompanying drawings, in which embodiments of the inventive concepts are shown. However, the present application is not to be construed as limited to the embodiments set forth herein. Rather, these embodiments are provided so that this disclosure will be thorough and complete, and to convey example scope of the embodiments to those skilled in the art. Like reference numbers refer to like elements throughout.

Known touch sensor technologies for resistive touch and projected capacitive provide a relatively rigid touch panel component, which can limit their use in many emerging products, such as those where curved and/or flexible touch-input display devices are desired. At least some embodiments of the present disclosure are directed to providing touch-input display devices that may be flexible and/or may be formed on curved surfaces.

Figure 1:
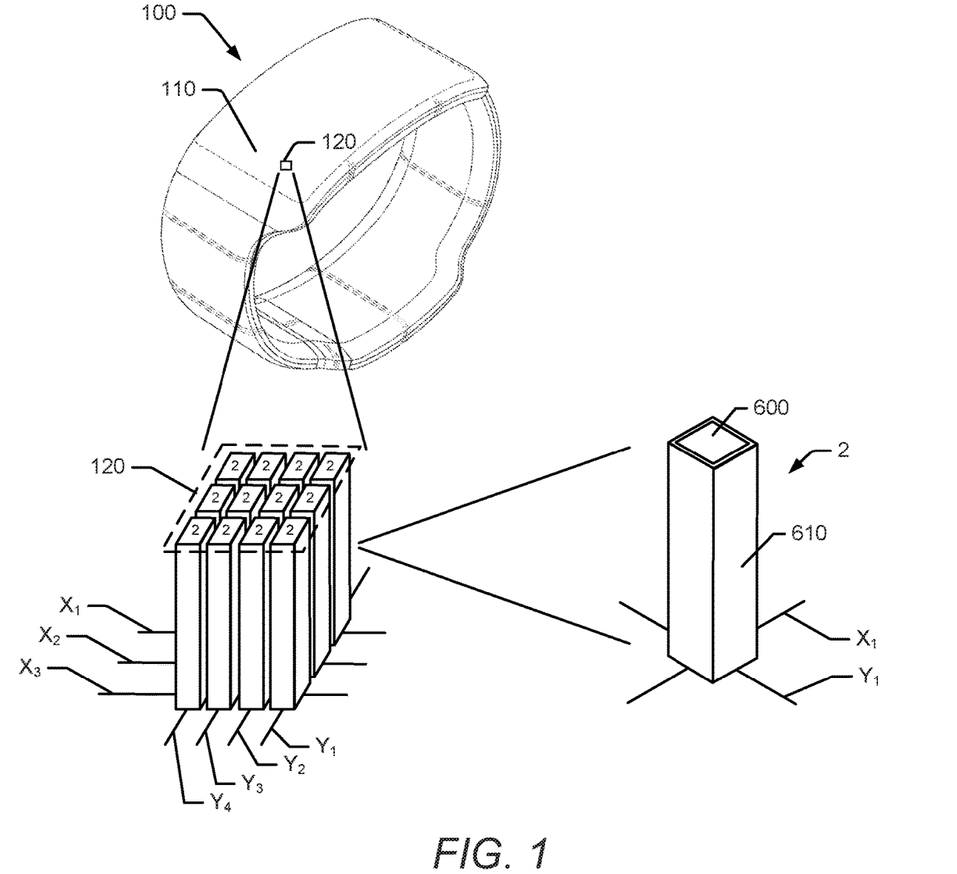
FIG. 1 is a system diagram that illustrates a smart watch with a curved flexible touch-input display device, a magnified view of an array of pillar structures within the touch-input display device, and a further magnified view of one of the pillar structures within the array, and configured according to some embodiments of the present disclosure.
Figure 2:
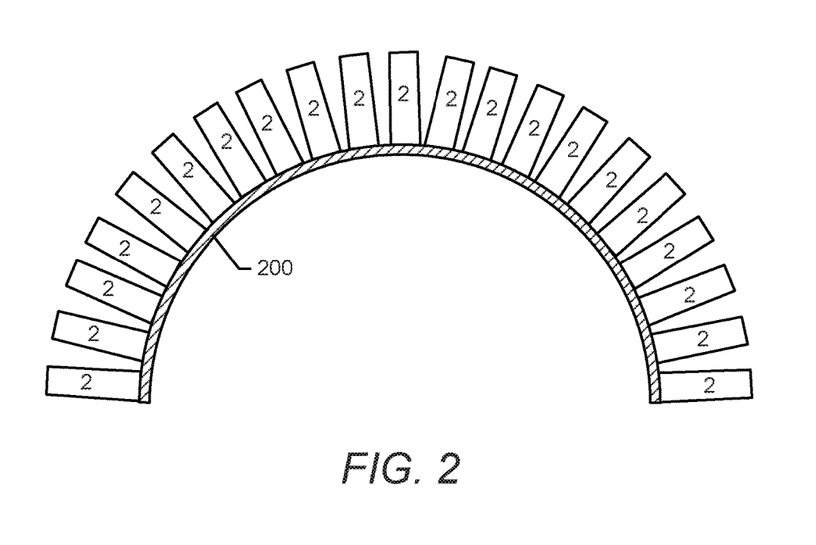
FIG. 2 is a cross sectional view of a curved touch-input display, which may correspond to the touch-input display device of FIG. 1, configured according to some embodiments of the present disclosure.

FIG. 1 is a system diagram showing a smart watch 100 with a curved flexible touch-input display device 110. A magnified view of an array 120 of piezoelectric pillars 2 within the touch-input display device 110 is shown along with a further magnified view of one of the piezoelectric pillars 2 within the array 120, configured according to some embodiments of the present disclosure. FIG. 2 is a cross sectional view of a curved touch-input display, which may correspond to the touch-input display device of FIG. 1 after further flex induced curvature, configured according to some embodiments of the present disclosure.

Although some embodiments are described in the context of a curved flexible touch-input display device 110 for a smart watch 100, it is to be understood that inventive concepts of the present disclosure can be more broadly used in any sort of touch-input display device for any type of electronic device.

Figure 7:
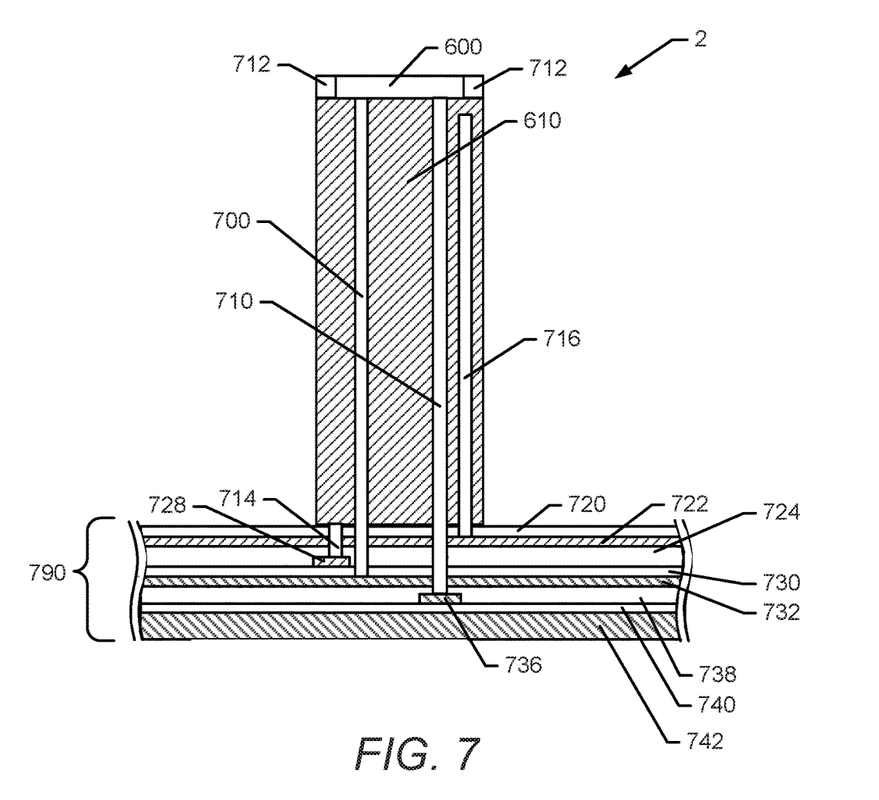
FIG. 7 illustrates a cross-sectional view of the pillar structure in FIG. 6 along line 7-7 configured according to some embodiments of the present disclosure.
Figure 9:
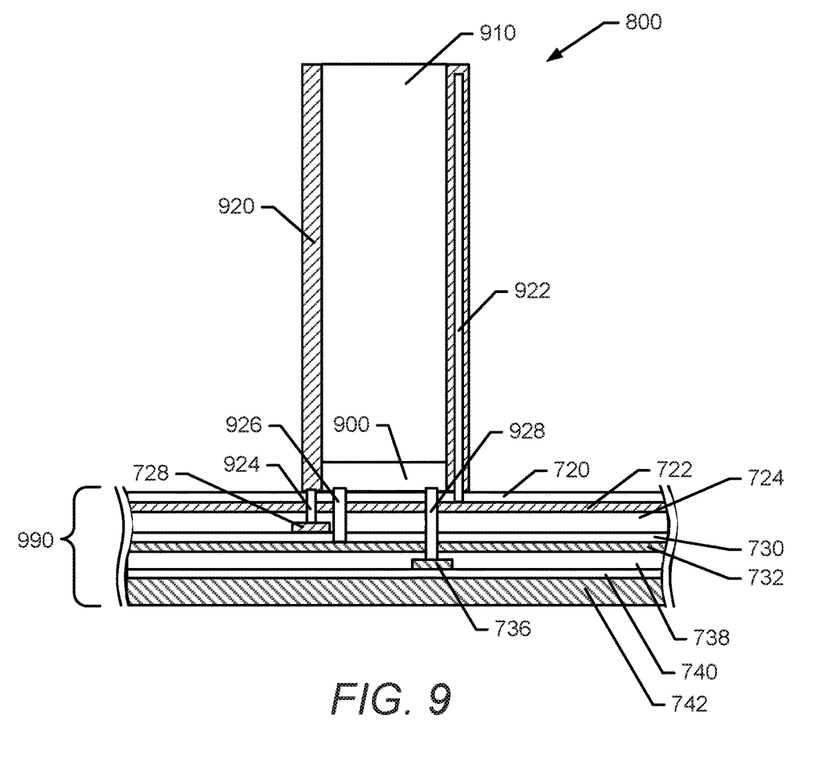
FIG. 9 illustrates a cross-sectional view of the pillar structure in FIG. 8 along line 9-9 configured according to some embodiments of the present disclosure.

The pillar structures 2 are on a substrate 200 that may be a rigid structure that is planar or curved, or may be a flexible structure that is bendable by a user. Power lines may be formed within the substrate 200 and arranged in row X and column Y directions. Signal lines may also be formed within the substrate 200 and arranged in the row X and column Y directions. Although single conductive lines have been illustrated in FIG. 1 for each row X and column Y extending underneath the array 120 to electrically connect to defined ones of the pillar structures 2, it is to be understood that each line can represent a pair of one of the power lines and one of the signal lines or a plurality of various power and/or signal lines, such as illustrated in FIGS. 7 and 9 and discussed further below.

The pillar structures 2 are on and extend away from a surface of the substrate 200. Each of the pillar structures 2 includes a piezoelectric pillar 610 and at least one light emitter device 600. The piezoelectric pillar 610 generates an electric voltage across a pair of the signal lines responsive to an applied touch force compressing the piezoelectric pillar 610. The piezoelectric pillars 610 can be electrically isolated from each other to inhibit the flow of electric charge, generated by a user's touch compression of one of the piezoelectric pillars 610, to an adjacent one of the piezoelectric pillars 610.

As illustrated in FIG. 1, at least one light emitter device 600 is coupled to each of the piezoelectric pillars 610, and the light emitter device 600 is electrically connected to a pair of the power lines, e.g., X1 and Y1, underneath the piezoelectric pillar 610. The light emitter device 600 may be any electrical device that emits visible or invisible light responsive to applied power. Non-limiting examples of a light emitter device 600 includes a light emitting diode and a semiconductor laser. A light emitting diode can include a PN junction diodes connected between a pair of the power lines underneath the piezoelectric pillar 610 to be selectively powered-on when a threshold voltage is applied by a display driver circuit 1050 (FIG. 10) across that pair of the power lines. Each light emitter device 600 may operate as a separately addressable pixel of the touch-input display device 110, or groups of light emitter device 600 coupled to a same piezoelectric pillar 610 or coupled to a group of adjacent piezoelectric pillars 610 may operate as a separately addressable pixel of the touch-input display device 110. An individual light emitter device 600 may be configured to emit multiple different color wavelengths, e.g., red, green, blue, by, for example, including a plurality of differently configured PN junction diodes and/or overlying color filter layers on a same substrate of the light emitter device 600.

The pillar structures 2 can be arranged on the substrate 200 in the row X and column Y directions, such as illustrated by the array 120. The corresponding piezoelectric pillars 610 can electrically connect to different pairs of one of the signal lines in the row direction (e.g., X1, X2, X3, . . . ) and one of the signals lines in the column direction (e.g., Y1, Y2, Y3, Y4, . . . ), in the substrate 200 underneath the respective piezoelectric pillar 610. The light emitter devices 600 can electrically connected to different pairs of one of the power lines in the row direction (e.g., X1, X2, X3, . . . ) and one of the power lines in the column direction (e.g., Y1, Y2, Y3, Y4, . . . ), in the substrate 200 underneath the respective piezoelectric pillar 610.

Figure 3:
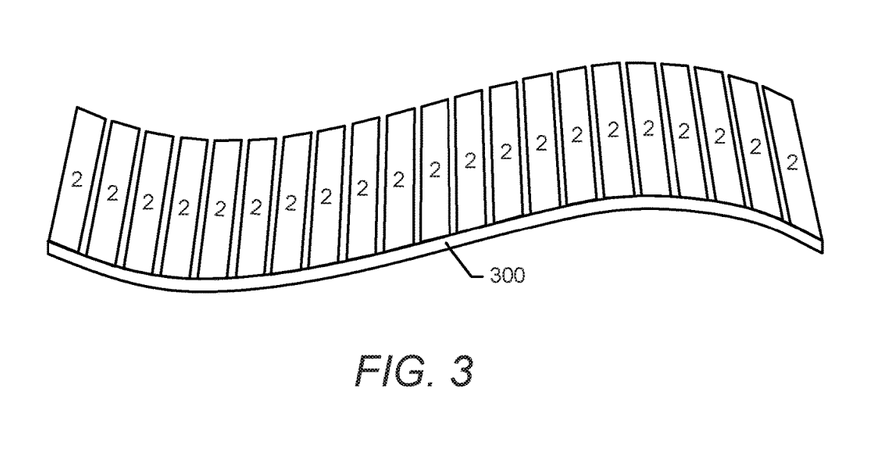
FIG. 3 is a cross sectional view of a curved touch-input display, which may correspond to the touch-input display device of FIG. 1, configured according to some embodiments of the present disclosure.

FIG. 3 is a cross sectional view of a curved touch-input display, which may correspond to the touch-input display device of FIG. 1, according to some embodiments of the present disclosure. The touch-input display includes the pillar structures 2 extending away from a surface of the substrate 300. The substrate 300 may be a rigid curved structure, or may be a flexible structure that is bendable by a user, including to the shape illustrated in FIG. 3.

Figure 4:
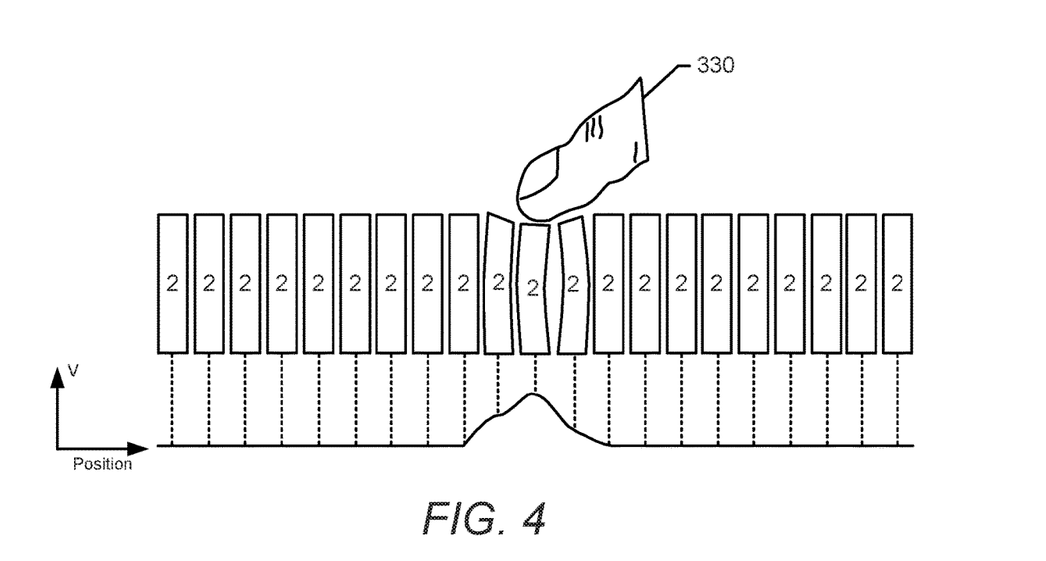
FIG. 4 illustrates a side view of a column of pillar structures with some of the pillar structures being deformed by an applied touch force and illustrates a corresponding graph of voltage generated by piezoelectric pillars of the pillar structure being deformed by the applied touch force, according to some embodiments of the present disclosure.

FIG. 4 illustrates a side view of a column of pillar structures 2 with some of the pillar structures 2 being deformed by an applied touch force from a finger 330, according to some embodiments of the present disclosure. FIG. 4 also illustrates a corresponding graph of voltage generated by the piezoelectric pillars 610 being deformed by the applied touch force. The piezoelectric material of the each of the compressed ones of piezoelectric pillars 610 responsively generates an electric voltage across a connected pair of the signal lines. The voltage level generated by the compressed ones of the piezoelectric pillars 610 can depend upon the amount of stress induced in the piezoelectric material forming the respective ones of the piezoelectric pillars 610.

Figure 5:
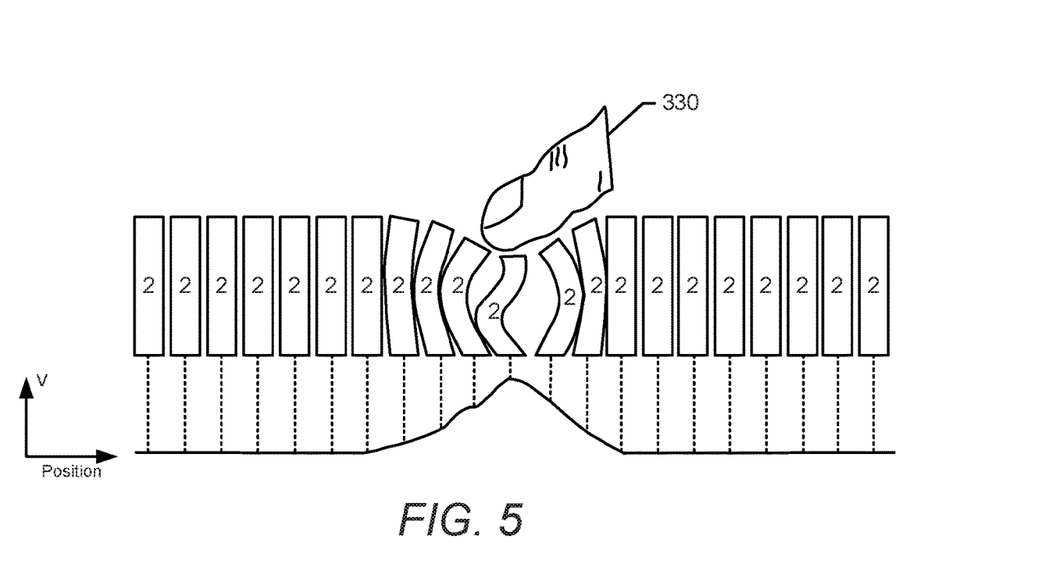
FIG. 5 illustrates a further side view of the column of pillar structures in FIG. 4, but with some of the piezoelectric pillars being deformed by a greater applied touch force than in FIG. 4, and illustrates a corresponding graph of voltage generated by the piezoelectric pillars being deformed by the greater applied touch force, according to some embodiments of the present disclosure.

FIG. 5 illustrates a further side view of the column of the pillar structures 2 in FIG. 4, but with some of the pillar structures 2 being deformed by a greater applied touch force than in FIG. 4. FIG. 5 also illustrates a corresponding graph of voltage generated by the piezoelectric pillars 610 being deformed by the greater applied touch force.

In FIGS. 4 and 5 the sizes of the pillar structures 2 relative to the finger 330 and the amount of compression of the pillar structures 2 responsive to touch force has been exaggerated for ease of illustration and explanation. The amount of compression exhibited by the pillar structures 2 can depend upon factors including: 1) the type of piezoelectric material forming the piezoelectric pillars 610; 2) flexibility of the substrate 200; and/or 3) other structural elements of the touch-input display device (e.g., light emitter devices, any material used to fill spaces between adjacent piezoelectric pillars 610, power electrodes extending through the piezoelectric pillars 610, sensor electrodes extending through the piezoelectric pillars 610, etc.)

As explained above, the piezoelectric pillars 610 are spaced apart from each other on the surface of the substrate 200 and electrically isolated from each other. The piezoelectric pillars 610 may be electrically isolated from each other by an air gap between adjacent ones of the piezoelectric pillars 610, and/or may be electrically isolated from each other by an electrical insulating material formed between adjacent ones of the piezoelectric pillars 610. For example, side surfaces of each of the piezoelectric pillars 610 may be coated with an electrical insulating material and/or spaces between the piezoelectric pillars 610 may be filled with an electrical insulating material.

Figure 6:
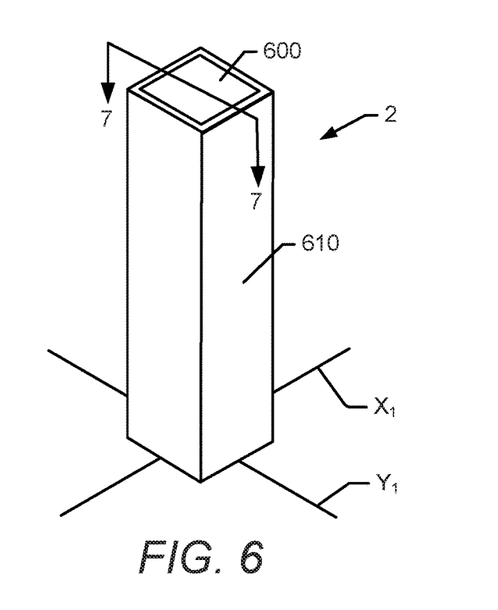
FIG. 6 illustrates an isometric view of a pillar structure configured for use in a touch-input display device according to some embodiments of the present disclosure.

FIG. 6 illustrates an isometric view of a pillar structure 2, which can correspond to one of the pillar structures 2 illustrated in FIG. 1, is configured for use in a touch-input display device. FIG. 7 illustrates a cross-sectional view of the pillar structure 2 in FIG. 6 along line 7-7 configured according to some embodiments of the present disclosure.

Referring to the example cross-sectional view of FIG. 7, the pillar structure 2 includes a substrate 790, a piezoelectric pillar 610, and a light emitter device 600. The substrate 790 has embedded power lines 732 and 736 and embedded signal lines 722 and 728. The piezoelectric pillar 610 is on and extends away from a surface of the substrate 790. The piezoelectric pillar 610 is formed from a piezoelectric material that generates an electric voltage across the signal lines 722 and 728 responsive to an applied touch force compressing the piezoelectric pillar 610. The piezoelectric material may include, but is not limited to, barium titanate, lead titanate, and/or lead zirconate titanate.

The piezoelectric pillar 610 has a proximate end attached to the substrate 790 and a distal end opposite to the proximate end. The distal end has a substantially planar surface and the light emitter device 600 is coupled to the substantially planar surface of the distal end of the piezoelectric pillar 610.

The pillar structure 2 further includes a pair of power electrodes 700 and 710 extending through an interior portion of the piezoelectric pillar 610 from a pair of the power lines 732 and 736 to electrically connect to contacts of the light emitter device 600. The pillar structure 2 further includes a pair of voltage sensing electrodes 714 and 716. The voltage sensing electrode 716 extends through the interior portion of the piezoelectric pillar 610 from one of the signal lines 722 to at least half way toward the distal end of the piezoelectric pillar 610, e.g., adjacent to but electrically isolated from the light emitter device 600 or extending to a top region of the piezoelectric pillar 610. The other voltage sensing electrode 714 extends from another one of the signal lines 728 to the proximate end of the piezoelectric pillar 610, e.g., directly contacting a bottom surface of the piezoelectric pillar 610 and/or extending into a bottom region of the piezoelectric pillar 610.

Configuring the pair of voltage sensing electrodes 714 and 716 is this manner enables sensing charge generated between an upper region and lower region of the piezoelectric pillar 610 responsive to compression of the piezoelectric pillar 610. As used herein, compression includes shorting of a length of the piezoelectric pillar 610 in a direction toward from the substrate 790, and/or bending of the piezoelectric pillar 610 with resulting strain along one side and stress along the opposite side of the piezoelectric pillar 610.

In the example substrate 790 of FIG. 7, the power lines 732 and 736 are formed as conductive layers in the substrate 760 and arranged in row and column directions. The signal lines 722 and 728 are also formed as conductive layers in the substrate 760 and arranged in the row and column directions. The example substrate 790 has a stacked structure including: a support structure 742; an electrical insulator layer 740 formed on the support structure 742; a power line 736 (e.g., X direction) formed on the electrical insulator layer 740 and extending into the page; an electrical insulator layer 738 formed on the power line 736; another power line 732 (e.g., Y direction) formed on the electrical insulator layer 738; an electrical insulator layer 730 formed on the power line 732; a signal line 728 (e.g., X direction) formed on the electrical insulator layer 730; an electrical insulator layer 724 formed on the signal line 728; another signal line 722 (e.g., Y direction) formed on the electrical insulator layer 724; and an electrical insulator layer 720 formed on the signal line 722. The piezoelectric pillar 610 may be formed directly on the electrical insulator layer 720. The power lines 732 and 736 are thereby electrically isolated from each other and from the signal lines 722 and 728, and the signal lines 722 and 728 are electrically isolated from each other.

The piezoelectric pillars of the array 120 can be arranged on the substrate 790 in the row and column directions, and electrically connect to different pairs of one of the signal lines 728 in the row direction (e.g., X direction) and one of the signals lines 722 in the column direction (e.g., Y direction). The light emitter devices 600 electrically connect to different pairs of one of the power lines 736 in the row direction (e.g., X direction) and one of the power lines 732 in the column direction (e.g., Y direction).

With further reference to the piezoelectric pillar 610 of FIGS. 6 and 7, a height of the piezoelectric pillar 610 in a direction extending away from the surface of the substrate (upward in FIG. 7) is, in one embodiment, greater than any cross-section dimension of the piezoelectric pillar 610 in a direction (X and Y directions) parallel to the surface of the substrate 790 under the piezoelectric pillar 610.

Figure 8:
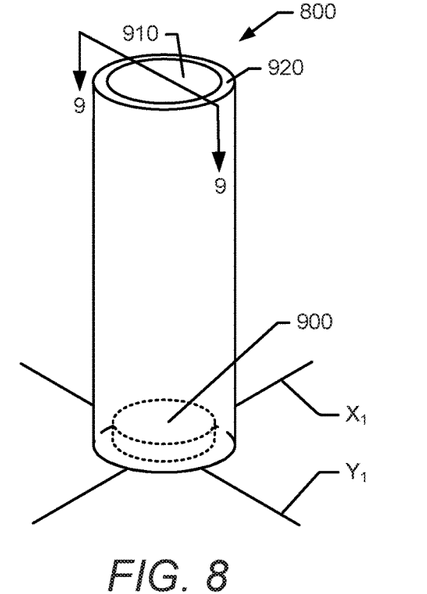
FIG. 8 illustrates an isometric view of another pillar structure configured for use in a touch-input display device according to some embodiments of the present disclosure.

FIG. 8 illustrates an isometric view of another pillar structure 800 configured for use in a touch-input display device, such as the display 110 of FIG. 1, configured according to some embodiments of the present disclosure. FIG. 9 illustrates a cross-sectional view of the pillar structure 800 in FIG. 8 along line 9-9 configured according to some embodiments of the present disclosure.

Referring to FIGS. 8 and 9, the pillar structure 800 includes a piezoelectric pillar 920 forming a hollow tube with an interior tubular shaped area void of piezoelectric material. At least one of the light emitter devices 900 is located within the hollow tube of the piezoelectric pillar 920. The piezoelectric pillar 920 has a proximate end attached to a substrate 990 and a distal end opposite to the proximate end. A light conducting material 910 is within the hollow tube of piezoelectric pillars 920 and extends from an upper surface of the at least one light emitter device 900 toward the distal end of the piezoelectric pillar 920. In another embodiment the hollow tube of the piezoelectric pillar 920 is on at least one of the light emitter devices so that light travels through the light conducting material within the hollow tube. Thus, a sub-array of plurality of light emitter devices can be configured to shine through a same hollow tube of a piezoelectric pillar 920, and a larger array of the sub-arrays can be configured to shine through the hollow tubes of a plurality of the piezoelectric pillars 920.

The substrate 990 has embedded power lines 732 and 736 and embedded signal lines 722 and 728. The piezoelectric pillar 920 is on and extends away from a surface of the substrate 990. The piezoelectric pillar 920 is formed from a piezoelectric material that generates an electric voltage across the signal lines 722 and 728 responsive to an applied touch force compressing the piezoelectric pillar 920.

In one embodiment, the light conducting material 910 includes a light conducting polymer, and may extend from the at least one light emitter device 900 to the distal end of the piezoelectric pillar 920. The light conductive material 910 may be any clear or opaque material that allows light from the light emitter device 900 to pass there through and exit the distal end of the tube to provide light therefrom. The hollow tube may extend from the proximate end to the distal end of the piezoelectric pillar 920.

In the example embodiment shown in FIG. 9, the at least one light emitter device 900 is directly coupled to the substrate 990 at the proximate end of the piezoelectric pillar 920 within the hollow tube. The light conducting material 910 extends through the hollow tube from the upper surface of the at least one light emitter device 900 to the distal end of the piezoelectric pillar 920.

The pillar structure 900 further includes a pair of power electrodes 926 and 928 extending from a pair of the power lines 732 and 736 to electrically connected to contacts of the at least one light emitter device 900. The pillar structure 900 further includes a pair of voltage sensing electrodes 922 and 924. The voltage sensing electrode 922 extends through the interior portion of a wall of the hollow tube of the piezoelectric pillar 920 from one of the signal lines 722 to at least half way toward the distal end of the piezoelectric pillar 920, e.g., extending to a top region of the piezoelectric pillar 920. The other voltage sensing electrode 924 extends from another one of the signal lines 728 to the proximate end of the piezoelectric pillar 920, e.g., directly contacting a bottom surface of the piezoelectric pillar 920 and/or extending into a bottom region of the piezoelectric pillar 920.

Configuring the pair of voltage sensing electrodes 922 and 924 is this manner enables sensing charge generated between an upper region and lower region of the piezoelectric pillar 920 responsive to compression of the piezoelectric pillar 920. As used herein, compression includes shorting of a length of the piezoelectric pillar 920 in a direction toward from the substrate 790, and/or bending of the piezoelectric pillar 920 with resulting strain along one side and stress along the opposite side of the piezoelectric pillar 920.

In the example substrate 990 of FIG. 9, the power lines 732 and 736 are formed as conductive layers in the substrate 760 and arranged in row and column directions. The signal lines 722 and 728 are also formed as conductive layers in the substrate 760 and arranged in the row and column directions. The example substrate 990 has a stacked structure including: a support structure 742; an electrical insulator layer 740 formed on the support structure 742; a power line 736 (e.g., X direction) formed on the electrical insulator layer 740 and extending into the page; an electrical insulator layer 738 formed on the power line 736; another power line 732 (e.g., Y direction) formed on the electrical insulator layer 738; an electrical insulator layer 730 formed on the power line 732; a signal line 728 (e.g., X direction) formed on the electrical insulator layer 730; an electrical insulator layer 724 formed on the signal line 728; another signal line 722 (e.g., Y direction) formed on the electrical insulator layer 724; and an electrical insulator layer 720 formed on the signal line 722. The piezoelectric pillar 920 may be formed directly on the electrical insulator layer 720. The power lines 732 and 736 are thereby electrically isolated from each other and from the signal lines 722 and 728, and the signal lines 722 and 728 are electrically isolated from each other.

With further reference to the piezoelectric pillar 920 of FIGS. 8 and 9, a height of the piezoelectric pillar 920 in a direction extending away from the surface of the substrate (upward in FIG. 7) is, in one embodiment, greater than any cross-section dimension of the piezoelectric pillar 920 in a direction (X and Y directions) parallel to the surface of the substrate 990 under the piezoelectric pillar 920.

Figure 10:
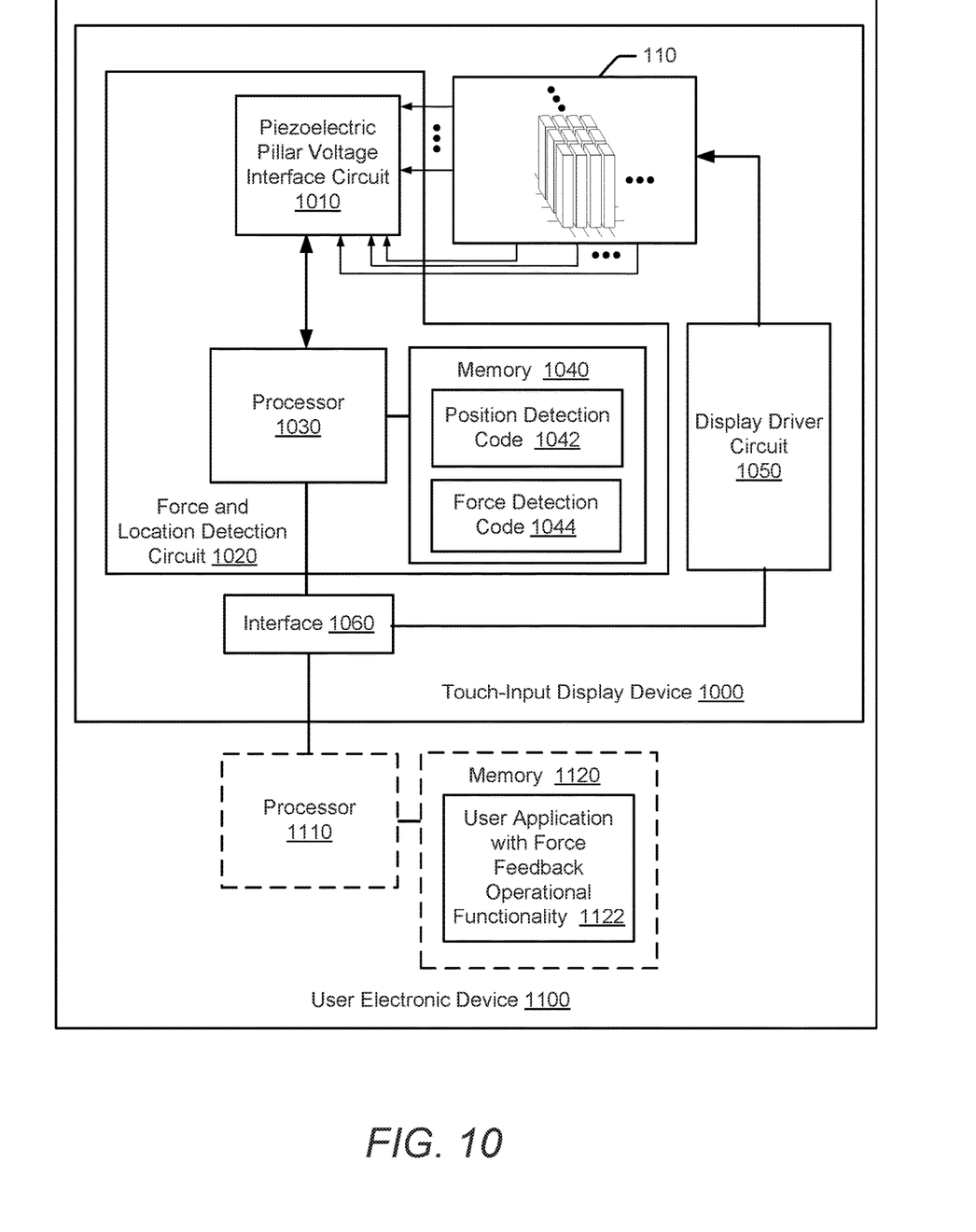
FIG. 10 illustrates a block diagram of a user electronic device that includes a touch-input display device configured according to some embodiments of the present disclosure.

FIG. 10 illustrates a block diagram of a user electronic device 1100 that includes a touch-input display device 1000 configured according to some embodiments of the present disclosure. Referring to FIG. 10, the touch-input display device 1000 includes an array 110 of pillar structures, which may be configured according to one or more embodiments disclosed herein. A piezoelectric pillar voltage interface circuit 1010 is configured to convert the electric voltage generated across a pair of the signal lines by a compressed piezoelectric pillar to a digital value that is provided to a processor 1030. The circuit 1010 can include an address converter logic device that converts an address value, received from a read operation signal from the processor 1030, into a selection signal that controls a multiplexer to pass-through a selected pair of the signal lines (e.g., a selected one of the row signal lines and a selected one of the column signal lines) to an analog-to-digital converter, which outputs a digital value representing the voltage level on the selected pair of the signal lines.

The processor 1030 may include one or more data processing circuits, such as a general purpose and/or special purpose processor (e.g., microprocessor and/or digital signal processor) that may be collocated or distributed across one or more networks. The processor 1030 is configured to execute computer program code in the memory 1040, described below as a non-transitory computer readable medium, to perform at least some of the operations described herein as being performed by a user terminal. The illustrated computer program code includes position detection code 1042 and force detection code 1044 that are processed by the processor 1030 to operate according to one or more of embodiments disclosed herein for a touch-input display device.

The processor 1030 executes the position detection code 1042 to read values from the circuit 1010 to separately measure electric voltage on different pairs of the signal lines, and generates location data that indicates a location of the one of the piezoelectric pillars that generated the measured electric voltage. The processor 1030 executes the force detection code 1044 to generate force data that indicates a level of touch force applied to one of the piezoelectric pillars based on the measured electric voltage.

A display driver circuit 1050 individually addresses the light emitter device coupled to the array 110 of piezoelectric pillars by selecting one of the pairs of the power lines and supplies power to the selected one of the pairs of the power lines. The position detection code 1042 may cause the processor 1030 to individually addresses one of the light emitter devices by selecting one of the pairs of the power lines and supplies power to the selected one of the pairs of the power lines. The force detection code 1044 may cause the processor 1030 to operate to separately measure electric voltage on different groups of pairs of the signal lines, and/or the piezoelectric pillar voltage interface circuit 1010 may be separately configured to separately measure electric voltage on different groups of pairs of the signal lines. The force detection code 1044 may cause the processor 1030 to generate force data that indicates a level of a touch force applied to a group of the piezoelectric pillars based on the measured electric voltage, and the position detection code 1042 may correspondingly cause the processor 1030 to generate the location data to indicate a location of at least one of the piezoelectric pillars in the group.

The force detection code 1044 may cause the processor 1030 to respond to one of the measured electric voltages exceeding a threshold voltage by generating the force data, and the position detection code 1042 may correspondingly cause the processor 1030 to generate the location data based on the one of the measured electric voltages. The location data may be generated to include a row reference value and a column reference value for one of the piezoelectric pillars centrally located within the group of the piezoelectric pillars.

The processor 1030 may communicate the force data and the location data through an interface circuit 1060 to another processor 1110. The processor 1110 may include one or more data processing circuits, such as a general purpose and/or special purpose processor (e.g., microprocessor and/or digital signal processor) that may be collocated or distributed across one or more networks. The processor 1110 is configured to execute computer program code in a memory 1120, described below as a non-transitory computer readable medium, to perform at least some of the operations described herein as being performed by a user terminal. The illustrated computer program code includes a user application code 1122 that is configured to provide operational functionality to a user of the user electronic device 1100 and be controlled responsive to the force data and the location data received from the processor 1030 via the interface circuit 1060.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

In the drawings, the sizes and relative sizes of layers and regions exaggerated for clarity. It will be understood that when an element such as a layer (e.g., a conductive line, a semiconductor layer or an insulating layer), line, or other structure is referred to as being "on" or "coupled to" another element, it can be directly on or directly coupled to the other element or intervening elements may be present. It will be also understood that although the terms first, second, third etc. may be used herein to describe various elements, these elements should not be limited by these terms. These terms are only used to distinguish one element from another element. Thus, a first element in some embodiments could be termed a second element in other embodiments without departing from the teachings of the present inventive concepts.

Example embodiment have been described with cross-sectional views that are schematic illustrations of idealized embodiments and intermediate structures of example embodiments. Accordingly, shapes of the exemplary views may be modified according to manufacturing techniques and/or allowable errors. As such, variations from the shapes of the illustrations as a result, for example, of manufacturing techniques and/or tolerances, are to be expected. Thus, example embodiments of the inventive concepts should not be construed as limited to the particular shapes illustrated herein but may include deviations in shapes that result, for example, from manufacturing. For example, an element illustrated as a rectangle may have rounded or curved features at its edges rather than an abrupt change.

While the inventive concepts have been described with reference to example embodiments, it will be apparent to those skilled in the art that various changes and modifications may be made without departing from the spirit and scope of the inventive concepts. Therefore, it should be understood that the embodiments discussed herein are not limiting, but illustrative. Thus, the scopes of the inventive concepts are to be determined by the broadest permissible interpretation of the following claims and their equivalents and shall not be restricted or limited by the foregoing description.

The invention claimed is:

1. A touch-input display device comprising:
a substrate with power lines and signal lines;
piezoelectric pillars that are on and extend away from a surface of the substrate, the piezoelectric pillars are electrically isolated from each other, each of the piezoelectric pillars comprise a piezoelectric material that generates an electric voltage across a pair of the signal lines responsive to an applied touch force compressing the piezoelectric pillar, wherein the piezoelectric pillars each have a proximate end attached to the substrate and a distal end opposite to the proximate end, the distal end having a substantially planar surface; and
light emitter devices each coupled to a different one of the piezoelectric pillars and electrically connected to a pair of the power lines, wherein the light emitter devices are connected to the substantially planar surface of the distal end of the piezoelectric pillars.

2. The touch-input display device of claim 1, further comprising:
pairs of power electrodes, each pair of power electrodes extending through an interior portion of a different one of the piezoelectric pillars from a pair of the power lines to contacts of the light emitter device coupled to the piezoelectric pillar.

3. The touch-input display device of claim 2, further comprising:
pairs of voltage sensing electrodes, each pair of voltage sensing electrodes connected to a different one of the piezoelectric pillars, one of the voltage sensing electrodes of the pair extends through the interior portion of the piezoelectric pillar from one of the signal lines to at least half way toward the distal end of the piezoelectric pillar, and the other one of the voltage sensing electrodes of the pair extends from another one of the signal lines to the proximate end of the piezoelectric pillar.

4. A touch-input display device comprising:
a substrate with power lines and signal lines;
piezoelectric pillars that are on and extend away from a surface of the substrate, the piezoelectric pillars are electrically isolated from each other, each of the piezoelectric pillars comprise a piezoelectric material that generates an electric voltage across a pair of the signal lines responsive to an applied touch force compressing the piezoelectric pillar;
light emitter devices each coupled to a different one of the piezoelectric pillars and electrically connected to a pair of the power lines,
wherein the piezoelectric pillars each form a hollow tube and one of the light emitter devices is located within the hollow tube; and
a light conducting material within the hollow tube of each of the piezoelectric pillars extending from a surface of the one of the light emitter devices toward the distal end of the piezoelectric pillar.

5. The touch-input display device of claim 4, wherein:
the light conducting material comprises a light conducting polymer within the hollow tube of each of the piezoelectric pillars and extending from the surface of the one of the light emitter devices to the distal end of the piezoelectric pillar.

6. The touch-input display device of claim 4, wherein:
the hollow tube extends from the proximate end to the distal end of the piezoelectric pillars.

7. The touch-input display device of claim 4, wherein:
the light emitter devices are directly coupled to the substrate at the proximate end of the piezoelectric pillars within the hollow tube; and
the light conducting material extends through the hollow tube from the surface of the light emitter device to the distal end of the piezoelectric pillar.

8. The touch-input display device of claim 4, further comprising:
pairs of power electrodes, each pair of power electrodes extending from a pair of the power lines to contacts of the light emitter device within the hollow tube of one of the piezoelectric pillar.

9. The touch-input display device of claim 8, further comprising:
pairs of voltage sensing electrodes, each pair of voltage sensing electrodes connected to a different one of the piezoelectric pillars, one of the voltage sensing electrodes of the pair extends through material of the piezoelectric pillar from one of the signal lines to at least half way toward the distal end of the piezoelectric pillar, and the other one of the voltage sensing electrodes of the pair extends from another one of the signal lines to the proximate end of the piezoelectric pillar.

10. The touch-input display device of claim 4, further comprising:
a force and location detection circuit that separately measures electric voltage on different pairs of the signal lines, and generates force data that indicates a level of touch force applied to one of the piezoelectric pillars based on the measured electric voltage and generates location data that indicates a location of the one of the piezoelectric pillars that generated the measured electric voltage.

11. The touch-input display device of claim 10, further comprising:
a display driver circuit that individually addresses one of the light emitter devices by selecting one of the pairs of the power lines and supplies power to the selected one of the pairs of the power lines,
wherein the force and location detection circuit individually addresses one of the piezoelectric pillars by selecting one of the pairs of the signal lines and measures the electric voltage on the selected one of the pairs of the signal lines.

12. The touch-input display device of claim 1, wherein:
the power lines are arranged within the substrate in row and column directions and the signal lines are arranged within the substrate in the row and column directions;
the piezoelectric pillars are arranged on the substrate in the row and column directions, and electrically connect to different pairs of one of the signal lines in the row direction and one of the signals lines in the column direction; and
the light emitter devices are electrically connected to different pairs of one of the power lines in the row direction and one of the power lines in the column direction.

13. The touch-input display device of claim 1, further comprising:
a force and location detection circuit that separately measures electric voltage on different groups of pairs of the signal lines, and generates force data that indicates a level of a touch force applied to a group of the piezoelectric pillars based on the measured electric voltage and generates location data that indicates a location of at least one of the piezoelectric pillars in the group.

14. The touch-input display device of claim 13, wherein:
the force and location detection circuit responds to one of the measured electric voltages exceeding a threshold voltage by generating the force data and the location data based on the one of the measured electric voltages.

15. The touch-input display device of claim 13, wherein:
the location data comprises a row reference value and a column reference value for one of the piezoelectric pillars centrally located within the group of the piezoelectric pillars.

16. The touch-input display device of claim 1, wherein:
a height of one of the piezoelectric pillars in a direction extending away from the surface of the substrate is greater than any cross-section dimension of the piezoelectric pillar in a direction parallel to the surface of the substrate under the piezoelectric pillar.

17. The touch-input display device of claim 1, wherein:
the piezoelectric pillars are spaced apart from each other on the surface of the substrate and electrically isolated from each other by an air gap between adjacent ones of the piezoelectric pillars.

18. The touch-input display device of claim 1, wherein:
the power lines are disposed within layers of the substrate and arranged in row and column directions;
the signal lines are disposed within layers of the substrate and arranged in the row and column directions, within the substrate the power lines are electrically isolated from each other and from the signal lines, and within the substrate the signal lines are electrically isolated from each other;
the piezoelectric pillars are arranged on the substrate in the row and column directions, and electrically connect to different pairs of one of the signal lines in the row direction and one of the signals lines in the column direction; and the light emitter devices electrically connect to different pairs of one of the power lines in the row direction and one of the power lines in the column direction.

19. A touch-input display device comprising:

a touch display circuit comprising:

a substrate with power lines and signal lines;

piezoelectric pillars that are on and extend away from a surface of the substrate, the piezoelectric pillars are electrically isolated from each other, each of the piezoelectric pillars comprise a piezoelectric material that generates an electric voltage across a pair of the signal lines responsive to an applied touch force compressing the piezoelectric pillar wherein the piezoelectric pillars each form a hollow tube and one of the light emitter devices is located within the hollow tube;

a light conducting material within the hollow tube of each of the piezoelectric pillars extending from a surface of the one of the light emitter devices toward the distal end of the piezoelectric pillar; and     light emitter devices each coupled to a different one of the piezoelectric pillars and electrically connected to a pair of the power lines;

an interface circuit that measures electric voltage on at least one pair of the signal lines to generate voltage data;

a processor coupled to receive the voltage data from the interfaced circuit; and a memory coupled to the processor and storing computer readable program code that is executable by the processor to:

generate force data that indicates a level of touch force applied to one of the piezoelectric pillars based on the voltage data and generate location data that indicates a location of the one of the piezoelectric pillars that generated the measured electric voltage.

* * * * *